United States Patent [19]
Olarig

[11] Patent Number: 5,978,953
[45] Date of Patent: Nov. 2, 1999

[54] ERROR DETECTION AND CORRECTION

[75] Inventor: Sompong P. Olarig, Cypress, Tex.

[73] Assignee: Compaq Computer Corporation, Houston, Tex.

[21] Appl. No.: 08/769,655

[22] Filed: Dec. 19, 1996

[51] Int. Cl.[6] .................................................. G11C 29/00
[52] U.S. Cl. .......................... 714/768; 714/758; 714/761; 714/763; 714/764; 714/767; 714/772; 714/774
[58] Field of Search .............................. 371/40.13, 40.12, 371/40.11, 40.17, 40.18, 37.1, 38.1, 40.2, 37.7, 21.2; 395/182.03, 182.06, 182.12, 185.09, 293, 858

[56] References Cited

U.S. PATENT DOCUMENTS

| | | | |
|---|---|---|---|
| 3,868,632 | 2/1975 | Hong et al. | 340/146.1 |
| 4,099,160 | 7/1978 | Flagg | 340/146.1 |
| 5,107,503 | 4/1992 | Riggle et al. | 371/37.1 |
| 5,226,043 | 7/1993 | Pughe, Jr. et al. | 371/40.1 |
| 5,331,645 | 7/1994 | Miller et al. | 371/37.1 |
| 5,331,646 | 7/1994 | Krueger et al. | 371/40.4 |

(List continued on next page.)

FOREIGN PATENT DOCUMENTS 2 182 789  8/1987  United Kingdom .

OTHER PUBLICATIONS

Notitsky et al., "Optimizing Systems Performance Based on Pentium (™) Processors", IEEE, pp. 63–72, 1993.

Avatar Saini, "Design of the Intel Pentium(™) Processor", IEEE, pp. 258–261 1993.

Michael Jahed, "Interfacing Synchronous DRAMs to Pentium Processors", IEEE, pp. 25–28 1995.

Bekerman, "A Performance Analysis of Pentium Processor Systems", IEEE, pp. 72–83, Oct. 1995.

Coe, "It Takes Six Ones To Reach a Flaw", IEEE, pp. 140–146, 1995.

Kaneda, "A Class of Odd–Weight–Column SEC–DED–SbED Codes for Memory System Applications", IEEE Trans. On Computers, vol. C–33, No. 8, pp. 737–739 (1984).

Rao, et al., Error–Control Coding for Computer Systems, Prentice–Hall, pp. 261–293 (1989).

D.C. Bossen, "b–Adjacent Error Correction", IBM J. Res. Develop., pp. 402–408 (Jul. 1970).

Shu Lin et al., "Error Control Coding, Fundamentals and Applications", pp. 9–81, Prentice–Hall, (1982).

Francis Y.C. Fung, "A Survey of the Theory of Error–Correcting Codes", (Undated —located in Internet).

M.Y. Hsiao, "A Class of Optimal Minimal Odd–Weight–Column SEC–DED Codes", IBM J. Res. Develop., pp. 395–400 (Jul. 1970).

H. Hoeve et al., "Error Correction and Concealment in the Compact Disc System", Phillips Technical Review, vol. 40, pp. 166–172 (1982).

*Primary Examiner*—William Grant
*Assistant Examiner*—McDieunel Marc
*Attorney, Agent, or Firm*—Sharp, Comfort & Merrett, P.C.

[57] ABSTRACT

A computer system includes a processor bus having processor data and processor check bits for performing error detection and correction of the processor data. A CPU is coupled to the processor bus. A memory sub-system is coupled to the processor bus and includes memory check bits, memory address bits, and memory data bits, and an error detection and correction device for detecting an error in the memory address bits using the memory check bits and for detecting an error in the memory data bits using the memory check bits. The CPU can include a processor from the Pentium® Pro family of processors. The error detection and correction device generates a syndrome table which includes a plurality of entries mapped to correctable or uncorrectable errors, in which a detected multiple-bit error in the memory data bits is mapped to an uncorrectable error entry and a detected error in the memory address bits is mapped to an uncorrectable error entry. An error detection device is also coupled to the processor bus for detecting an error in the address bits or data bits using the processor check bits.

23 Claims, 10 Drawing Sheets

U.S. PATENT DOCUMENTS

| | | | |
|---|---|---|---|
| 5,404,361 | 4/1995 | Casorso et al. | 371/40.1 |
| 5,452,261 | 9/1995 | Chung et al. | 365/233 |
| 5,481,552 | 1/1996 | Aldereguia et al. | 371/40.1 |
| 5,490,155 | 2/1996 | Abdoo et al. | 371/40.1 |
| 5,577,004 | 11/1996 | Leshem | 365/230.03 |
| 5,691,996 | 11/1997 | Chen et al. | 371/51.1 |
| 5,740,188 | 4/1998 | Olarig et al. | 371/40.1 |

| PCHK[Y] | 0000 0000<br>0123 4567 | 0011 1111<br>8901 2345 | 1111 2222<br>6789 0123 | 2222 2233<br>4567 8901 | 3333<br>2345 |
|---|---|---|---|---|---|
| 0 | xxx1 1111 | 1111 1111 | 1111 1000 | 0001 1010 | 0110 |
| 1 | xxx1 1111 | 1111 1100 | 1000 0111 | 1111 0101 | 0101 |
| 2 | xxx0 0000 | 0111 1111 | 1111 1111 | 1110 1100 | 1011 |
| 3 | xxx1 1111 | 1000 0011 | 0111 1111 | 1110 0011 | 1000 |
| 4 | xxx1 1010 | 0111 0011 | 0010 0110 | 1001 1111 | 1111 |
| 5 | xxx1 0101 | 0100 1010 | 1101 0101 | 0101 1111 | 1111 |
| 6 | xxx0 1100 | 1010 0101 | 1100 1011 | 0011 1111 | 1000 |
| 7 | xxx0 0011 | 1001 1100 | 0011 1000 | 1110 0000 | 0111 |

*FIG. 4*

| SYNDROME BITS | 0000 0000 0123 4567 | 0011 1111 8901 2345 | 1111 2222 6789 0123 | 22cc 2222 4525 6789 | 33cc 3333 0134 2345 | 3333 4444 6789 0123 | 4444 4455 4567 8901 | 5555 55cc 2345 6761 | 5566 66cc 8901 2370 | |
|---|---|---|---|---|---|---|---|---|---|---|
| 0 | 1000 1000 | 1000 1000 | 1000 1000 | 0100 0001 | 1100 0000 | 0000 1111 | 0000 1111 | 1111 1000 | 1100 1001 | PCHK(0) |
| 1 | 0100 0100 | 0100 0100 | 0100 0100 | 0100 0011 | 0100 0000 | 1111 0000 | 1111 0000 | 1111 1001 | 1000 1100 | PCKH(1) |
| 2 | 0010 0010 | 0010 0010 | 0010 0010 | 0110 0010 | 0100 1111 | 0000 0000 | 1111 1111 | 0000 1100 | 1100 1000 | PCHK(2) |
| 3 | 0001 0001 | 0001 0001 | 0001 0001 | 1100 0011 | 0110 1111 | 1111 1111 | 0000 0000 | 0000 1000 | 0100 1000 | PCHK(3) |
| 4 | 0000 0000 | 1111 0000 | 1111 1111 | 1000 1100 | 1001 1000 | 1000 1000 | 1000 1000 | 1000 0100 | 0001 1100 | PCHK(4) |
| 5 | 0000 1111 | 0000 1111 | 0000 1111 | 1001 1000 | 1100 0100 | 0100 0100 | 0100 0100 | 0100 0100 | 0011 0100 | PCHK(5) |
| 6 | 1111 0000 | 0000 1111 | 1111 0000 | 1100 1100 | 1000 0010 | 0010 0010 | 0010 0010 | 0010 0110 | 0010 0100 | PCHK(6) |
| 7 | 1111 1111 | 1111 0000 | 0000 0000 | 1000 0100 | 1000 0001 | 0001 0001 | 0001 0001 | 0001 1100 | 0011 0110 | PCHK(7) |

←———————— DATA CHECKS AND BITS ————————→

FIG. 5

SYNDROME TABLE

| | | | | | | | |
|---|---|---|---|---|---|---|---|
| 00 No Error | 20 CB5 | 40 CB6 | 60 UNCER | 80 CB7 | A0 UNCER | C0 UNCER | E0 DB60 |
| 01 CB0 | 21 UNCER | 41 UNCER | 61 DB12 | 81 UNCER | A1 DB4 | C1 DB0 | E1 UNCER |
| 02 CBI | 22 UNCER | 42 UNCER | 62 DB13 | 82 UNCER | A2 DB5 | C2 DB1 | E2 UNCER |
| 03 UNCER | 23 DB53 | 43 DB54 | 63 UNCER | 83 DB55 | A3 UNCER | C3 UNCER | E3 UNCER |
| 04 CB2 | 24 UNCER | 44 UNCER | 64 DB14 | 84 UNCER | A4 DB6 | C4 DB2 | E4 UNCER |
| 05 UNCER | 25 DB49 | 45 DB50 | 65 UNCER | 85 DB51 | A5 UNCER | C5 UNCER | E5 UNCER |
| 06 UNCER | 26 DB45 | 46 DB46 | 66 UNCER | 86 DB47 | A6 UNCER | C6 UNCER | E6 UNCER |
| 07 DB58 | 27 UNCER | 47 UNCER | 67 UNCER | 87 UNCER | A7 UNCER | C7 UNCER | E7 UNCER |
| 08 CB3 | 28 UNCER | 48 UNCER | 68 DB15 | 88 UNCER | A8 DB7 | C8 DB3 | E8 UNCER |
| 09 UNCER | 29 DB41 | 49 DB42 | 69 UNCER | 89 DB43 | A9 UNCER | C9 UNCER | E9 UNCER |
| 0A UNCER | 2A DB37 | 4A DB38 | 6A UNCER | 8A DB39 | AA UNCER | CA UNCER | EA UNCER |
| 0B DB29 | 2B UNCER | 4B UNCER | 6B UNCER | 8B UNCER | AB UNCER | CB UNCER | EB UNCER |
| 0C UNCER | 2C DB33 | 4C DB34 | 6C UNCER | 8C DB35 | AC UNCER | CC UNCER | EC UNCER |
| 0D DB59 | 2D UNCER | 4D UNCER | 6D UNCER | 8D UNCER | AD UNCER | CD UNCER | ED UNCER |
| 0E DB28 | 2E UNCER | 4E UNCER | 6E UNCER | 8E UNCER | AE UNCER | CE UNCER | EE UNCER |
| 0F UNCER | 2F DB31 | 4F DB25 | 6F UNCER | 8F DB56 | AF UNCER | CF UNCER | EF UNCER |
| 10 CB4 | 30 UNCER | 50 UNCER | 70 DB26 | 90 UNCER | B0 DB61 | D0 DB27 | F0 UNCER |
| 11 UNCER | 31 DB20 | 51 DB16 | 71 UNCER | 91 DB8 | B1 UNCER | D1 UNCER | F1 DB30 |
| 12 UNCER | 32 DB21 | 52 DB17 | 72 UNCER | 92 DB9 | B2 UNCER | D2 UNCER | F2 DB63 |
| 13 DB52 | 33 UNCER | 53 UNCER | 73 UNCER | 93 UNCER | B3 UNCER | D3 UNCER | F3 UNCER |
| 14 UNCER | 34 DB22 | 54 DB18 | 74 UNCER | 94 DB10 | B4 UNCER | D4 UNCER | F4 DB57 |
| 15 DB48 | 35 UNCER | 55 UNCER | 75 UNCER | 95 UNCER | B5 UNCER | D5 UNCER | F5 UNCER |
| 16 DB44 | 36 UNCER | 56 UNCER | 76 UNCER | 96 UNCER | B6 UNCER | D6 UNCER | F6 UNCER |
| 17 UNCER | 37 UNCER | 57 UNCER | 77 UNCER | 97 UNCER | B7 UNCER | D7 UNCER | F7 UNCER |
| 18 UNCER | 38 DB23 | 58 DB19 | 78 UNCER | 98 DB11 | B8 UNCER | D8 UNCER | F8 DB24 |
| 19 DB40 | 39 UNCER | 59 UNCER | 79 UNCER | 99 UNCER | B9 UNCER | D9 UNCER | F9 UNCER |
| 1A DB36 | 3A UNCER | 5A UNCER | 7A UNCER | 9A UNCER | BA UNCER | DA UNCER | FA UNCER |
| 1B UNCER | 3B UNCER | 5B UNCER | 7B UNCER | 9B UNCER | BB UNCER | DB UNCER | FB UNCER |
| 1C DB32 | 3C UNCER | 5C UNCER | 7C UNCER | 9C UNCER | BC UNCER | DC UNCER | FC UNCER |
| 1D UNCER | 3D UNCER | 5D UNCER | 7D UNCER | 9D UNCER | BD UNCER | DD UNCER | FD UNCER |
| 1E UNCER | 3E UNCER | 5E UNCER | 7E UNCER | 9E UNCER | BE UNCER | DE UNCER | FE UNCER |
| 1F DB62 | 3F UNCER | 5F UNCER | 7F UNCER | 9F UNCER | BF UNCER | DF UNCER | FF UNCER |

ERROR DETECTION AND CORRECTION

BACKGROUND

The invention relates to error detection and correction.

Error correction codes (ECCs) have been developed that both detect and correct certain errors. One well known class of ECC algorithm is the "Hamming codes," which are widely used in digital communications data storage systems. The Hamming codes are capable of detecting multiple bit errors and correcting single bit errors. A detailed description of the Hamming codes is found in Shu Lin et al., "Error Control Coding, Fundamentals and Applications," Chapter 3 (1982). Another well known ECC algorithm is the "Reed-Solomon code" widely used for error correction in the compact disk industry. A detailed description of this ECC algorithm is found in Hoeve et al., "Error Correction and Concealment in the Compact Disk System," *Philips Technical Review*, Vol. 40, No. 6, pp. 166–172 (1980). The Reed-Solomon code is able to correct two errors per word. Other conventional ECC algorithms include the b-adjacent error correction code described in D. C. Bossen, "B-Adjacent Error Correction," *IBM J. Res. Develop.*, pp. 402–408 (July 1970), and the odd weight column codes described in M. Y. Hsiao, "A Class of Optimal Minimal Odd Weight Column SEC-DED Codes," *IBM J. Res. Develop.*, pp. 395–400 (July 1970). The Hsiao codes, like the Hamming codes, are capable of detecting double-bit errors and correcting single-bit errors. The Hsiao codes use the same number of check bits as the Hamming codes (e.g., 8 check bits for 64 bits of data), but are superior in that hardware implementation is simplified and speed of error detection is improved.

Another type of ECC algorithm, which has been used in computer memory sub-systems, is described in co-pending and commonly assigned U.S. patent application Ser. No. 07/955,923, filed Oct. 2, 1992, entitled "Error Correction System for N Bits Using Error Correction Designed for Fewer than N Bits." The ECC algorithm described in this prior application, when coupled with a particular data distribution architecture, obtains the advantages of the Hamming codes with the same overhead (8 check bits for 64 bits of data), but also is able to correct any single 4-bit wide error.

Other types of ECC algorithms are described in co-pending and commonly assigned U.S. patent application Ser. No. 08/599,757, filed Feb. 12, 1996, entitled "Error Correction Codes"; and U.S. patent application Ser. No. 08/658,732, filed Jun. 5, 1996, entitled "Data Error Detection and Correction." The '757 application discusses using check bits to perform error detection and correction of both memory address and data signals.

Figure 9:
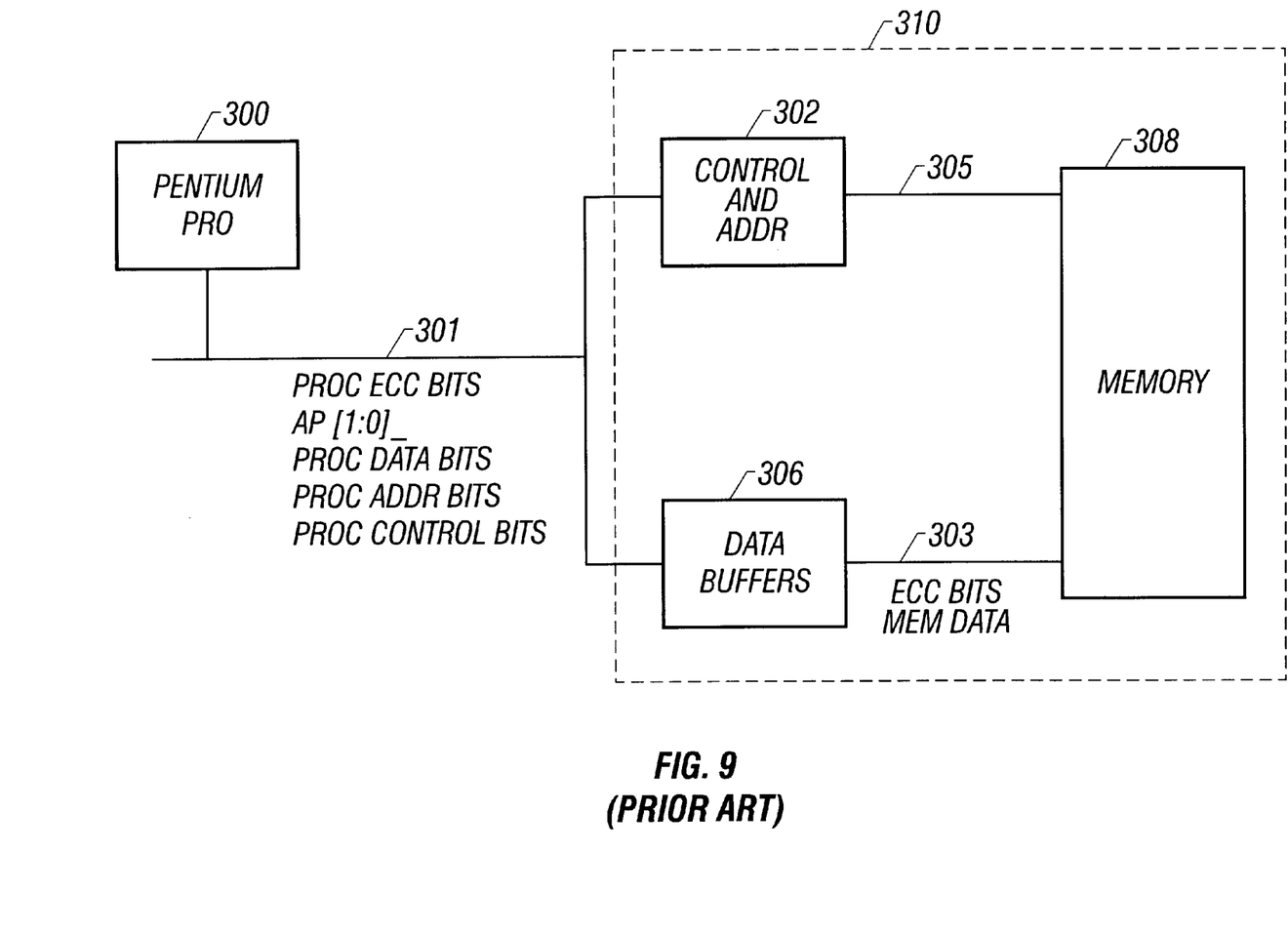
FIG. 9 is a schematic diagram of a processor chip set in a computer system.

Referring to FIG. 9, the Pentium® Pro processor chip set (from Intel Corporation), commonly referred to as the Orion chip set in the computer industry, contains the Pentium® Pro processor 300 connected to a processor bus 301 and a memory subsystem 310, which includes control and address block 302 and a data buffers block 306. The memory subsystem includes ECC logic in data buffers 306 for performing error detection and correction of memory data on memory data bus 303. Eight ECC bits on the memory data bus 303, which protect the memory data bus in the Orion chip set, are capable of correcting single-bit errors, detecting double-bit errors, and detecting all errors confined to one nibble on the memory data bus.

The Pentium® Pro processor bus 301 also includes eight processor ECC bits for detecting and correcting errors in the data lines of the processor bus. The Pentium® Pro processor bus 301 also includes parity protection for address/request signals and most control signals. A two-bit parity code protects the address portion of the processor bus. A first parity bit, represented as AP[0]_, protects processor address bits A[23:3]_ of the Pentium® Pro processor bus 301. A second address parity bit, represented as AP[1]_, protects processor address bits A[31:24]_ and A[35:24]_. Other parity bits are used to protect control signals on the Pentium® Pro processor bus 301.

SUMMARY

In general, in one aspect, the invention features a computer system having a processor from the Pentium® Pro family of processors, a memory device coupled to the processor for storing data and check bits, a bus coupled to the memory device having address bits and data bits, and an error detection and correction device coupled to the bus. The error detection and correction device detects an error in the address bits and detects and corrects an error in the data bits. The error detection and correction device includes a decoder receiving the check bits, address bits, and data bits for generating an indication that an address or data error has occurred using the check bits, and a correction circuit for correcting the data bits if a correctable data error is present. A mass storage device is also coupled to the processor.

In general, in another aspect, the invention features a computer system having a processor bus with processor data and processor check bits for performing error detection and correction of the processor data. A CPU is coupled to the processor bus. A memory sub-system is coupled to the processor bus and includes memory check bits, memory address bits, and memory data bits, and an error detection and correction device for detecting an error in the memory address bits using the memory check bits and for detecting and correcting an error in the memory data bits using the memory check bits.

In general, in another aspect, the invention features a computer system having a processor from the Pentium® Pro family of processor and a memory sub-system coupled to the processor. The memory sub-system includes memory check bits, memory address bits, and memory data bits, and an error detection and correction device for detecting an error in the memory address bits using the memory check bits and for detecting and correcting an error in the memory data bits using the memory check bits.

In general, in another aspect, the invention features a computer system having a CPU, a processor bus coupled to the CPU having address bits, data bits, and check bits, and an error detection device coupled to the processor bus for detecting an error in the address bits or data bits using the check bits.

Certain implementations of the invention may include one or more of the following features. The error detection and correction device includes a decoder receiving the memory check bits, memory address bits, and memory data bits for generating an indication that a memory address or data error has occurred using the memory check bits. A correction circuit corrects the data bits if a correctable memory data error is present. The error detection and correction device includes a partial address check bit generator for generating partial address check bits based on the memory address bits. The decoder further receives the partial address check bits to determine if a memory address or data error has occurred. The CPU includes a processor from the Pentium® Pro family of processors. The memory sub-system includes 64 or less memory data bits and 8 memory check bits. The memory sub-system includes 36 or less memory address bits. The error detection and correction device generates a syndrome table which includes a plurality of entries mapped to correctable or uncorrectable errors. A detected multiple-bit error in the memory data bits is mapped to an uncorrectable error entry and detected error in the memory address bits is mapped to an uncorrectable error entry.

In general, in another aspect, the invention features a computer system having a CPU, a processor bus coupled to the CPU having data bits and check bits, and an error management device coupled to the processor bus to detect an error in the data bits using the check bits. The error management device disables correction of the data bits using the check bits.

In general, in another aspect, the invention features a method of detecting errors and data bits of a processor bus coupled to a CPU in the computer system. Check bits and data bits of the processor bus are received. An error in the data bits is detected using the check bits. Correction of the data bits using the check bits is disabled.

Implementations of the invention may include the CPU having a Pentium® Pro processor.

Certain implementations of the invention include one or more of the following advantages. Additional parity bits or check bits (other than check bits used for data and check bit error detection and correction) are not needed to perform the memory address error detection, which reduces the hardware cost associated with additional memory space. Use of the check bits allow for detection of double-bit address bits errors, whereas use of a parity bit is limited to detection of odd-numbered address bit errors.

Other advantages in features will become apparent from the following description and from the claims.

DESCRIPTION

FIG. 6 is a syndrome table.

Figure 1:
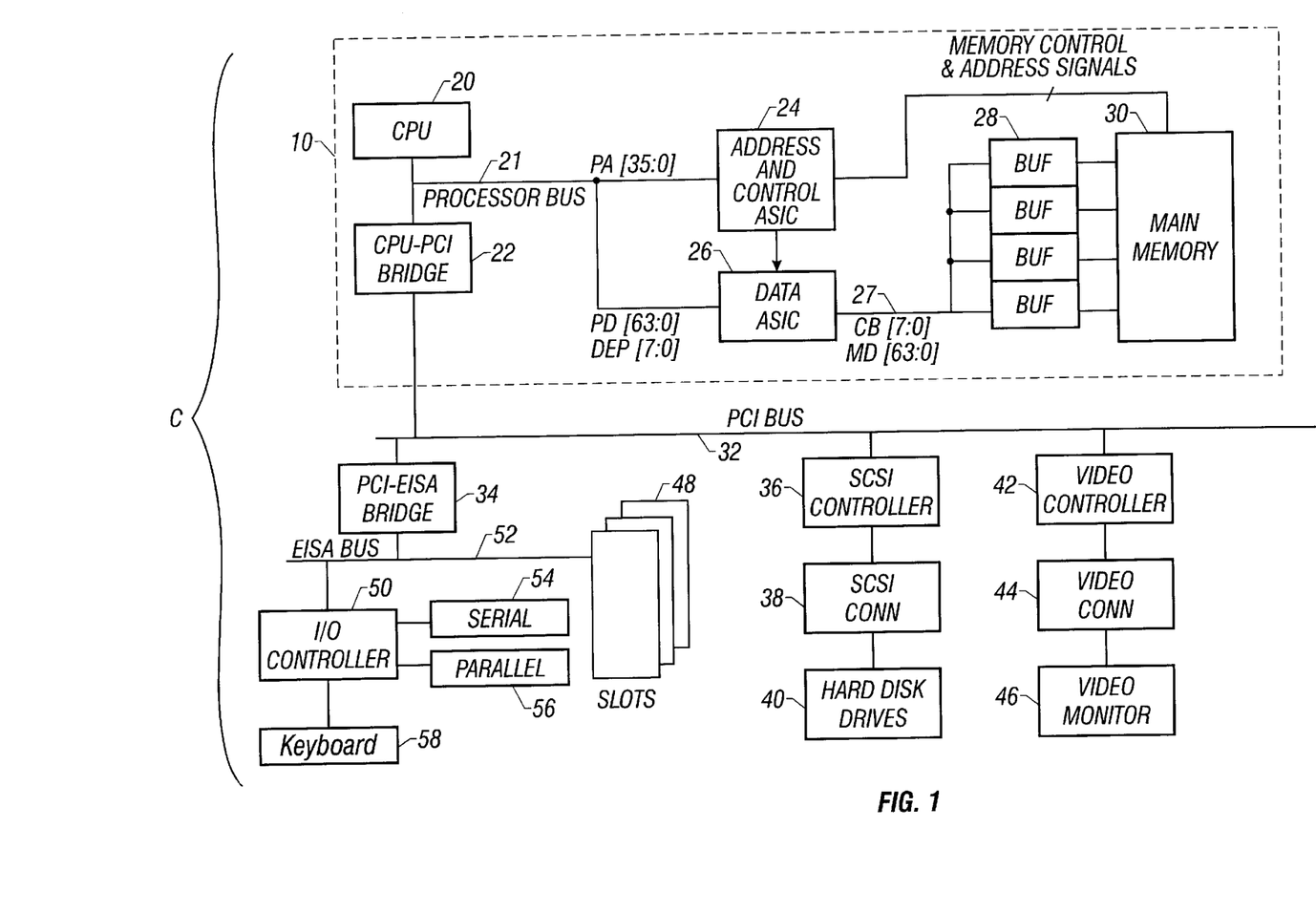
FIG. 1 is a block diagram of a computer system.

Referring to FIG. 1, a computer system C includes a processor board 10 connected to a Peripheral Component Interconnect (PCI) bus 32. The processor board 10 includes a central processing unit (CPU) 20 (such as the Pentium® Pro processor from Intel Corporation), which is connected to a processor bus 21 having lines for processor address bits PA[35:0], processor data bits PD [63:0], and eight processor check bits DEP[7:0]. Communication occurs between the processor bus 21 and the PCI bus 32 through a CPU-PCI bridge 22. The address and control lines of the processor bus 21 are connected to an address and control ASIC (application-specific integrated circuit) chip 24, which provides memory address signals and control signals (not shown) to the main memory 30. The data lines of the processor bus 21 are connected to a data ASIC chip 26, which includes data buffers and error detection and correction logic. The data ASIC chip 26 is connected by the lines of a 72-bit memory bus 27 (having memory data signals MD[63:0] and memory check bit signals CB[7:0]) to four 16-bit memory data buffers 28.

The PCI bus 32 is connected to a Small Computer Systems Interface (SCSI) controller 36 and a video controller 42. The SCSI controller 36 controls disk transactions to hard disk drives 40 through a SCSI connector 38. The video controller 42 is connected to a video monitor 46 through a video connector 44.

The computer system C also includes an Extended Industry Standard Architecture (EISA) bus 52, which communicates with the PCI bus 32 through a PCI-EISA bridge 34. The EISA bus 52 is connected to EISA slots 48, as well as an input/output (I/O) controller 50, which contains interfaces to a serial port 54, a parallel port 56, and a keyboard 58.

During memory read cycles, the data ASIC chip 26 performs error detection and correction of the data read from memory on data lines MD[63:0], using the memory check bits CB[7:0] which are also retrieved from memory. In addition, the data ASIC chip 26 performs error detection of the memory address on the address lines PA[35:0], using the check bits CB[7:0] and partial address check bits PCHK [7:0] produced by the address and control ASIC chip 24. The system is able to use the same set of memory check bits CB[7:0] to detect for and correct memory data errors and detect for memory address errors, as long as the data errors and address errors are mutually exclusive; that is, they do not occur in the same cycle.

The memory check bits CB[7:0] are generated by the data ASIC chip 26 during a memory write cycle and stored in the memory 30 along with the corresponding write data. The check bits CB[7:0] are determined from the write data and partial address check bits PCHK[7:0]. The stored byte of check bits CB[7:0] is retrieved during a read cycle to perform the error detection and correction. The partial address check bits PCHK[7:0] are generated by the address and control ASIC chip 24 from the memory address during each read cycle.

By encoding the partial address check bits PCHK[7:0] (address information) into the check bits CB[7:0], the check bits CB[7:0] can be used to detect address errors during read cycles.

Figure 2:
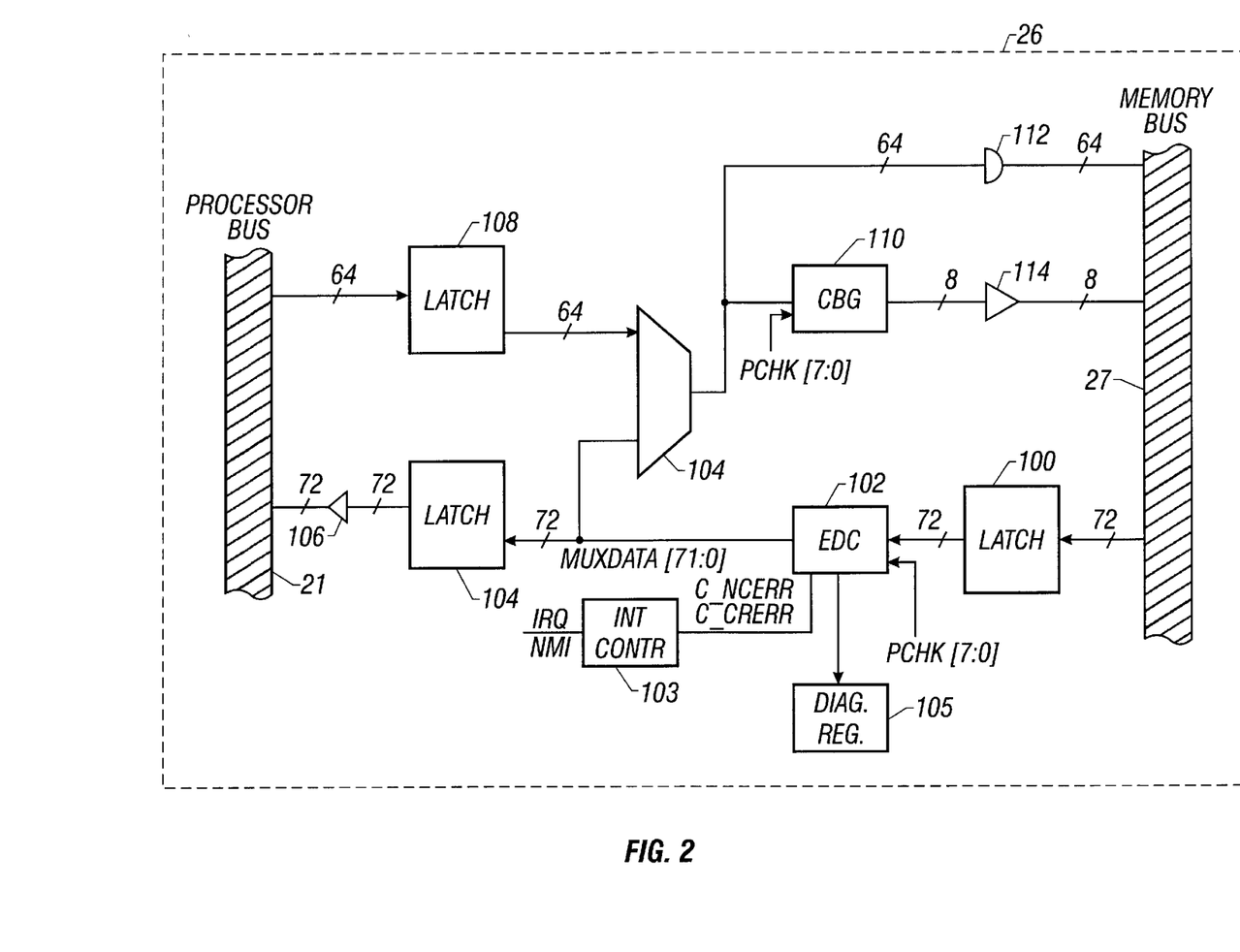
FIG. 2 is a schematic diagram of a data ASIC chip in the computer system.

Referring to FIG. 2, the components of the data ASIC chip 26 are shown. During a memory read cycle, data read from the main memory 30 on the memory bus 27 are loaded into a latch 100 from the memory bus 27. The read data, which include check bits CB[7:0] and the data bits MD[63:0], are provided to an error detection and correction (EDC) circuit 102. The partial address check bits PCHK[7:0] from the address and control ASIC chip 24 are also provided to the EDC circuit 102. Based on the check bits CB[7:0], partial address check bits PCHK[7:0], and the memory data, the EDC circuit 102 determines if an error has occurred in the memory data or address.

If the error is correctable (that is, a single-bit error in the memory data MD[63:0] has occurred), the erroneous bit is flipped by the EDC circuit 102. If the error is uncorrectable (that is, a multi-bit data error in the memory data lines or a single- or multi-bit error in the memory address lines has occurred), the EDC circuit 102 asserts a non-correctable error status signal to an interrupt controller (FIG. 2). Data from the EDC circuit 102 (including check bits and data bits) are provided to a latch 104, whose output is connected to buffers 106 for driving the read data onto the processor bus 21.

During a write cycle to the memory 30, write data from the processor bus 21 is loaded into a 64-bit latch 108 whose output is connected to one input of a multiplexor 104. The other input of the multiplexor 104 is connected to the output of the EDC circuit 102. The multiplexor 104 selects bytes from either the latch 108 or the EDC circuit 102 for output to a check-bit generator (CBG) 110 as well as to the input of a 64-bit buffer 112. The buffer 112 drives the selected data signals onto the memory bus 27.

Figure 5:
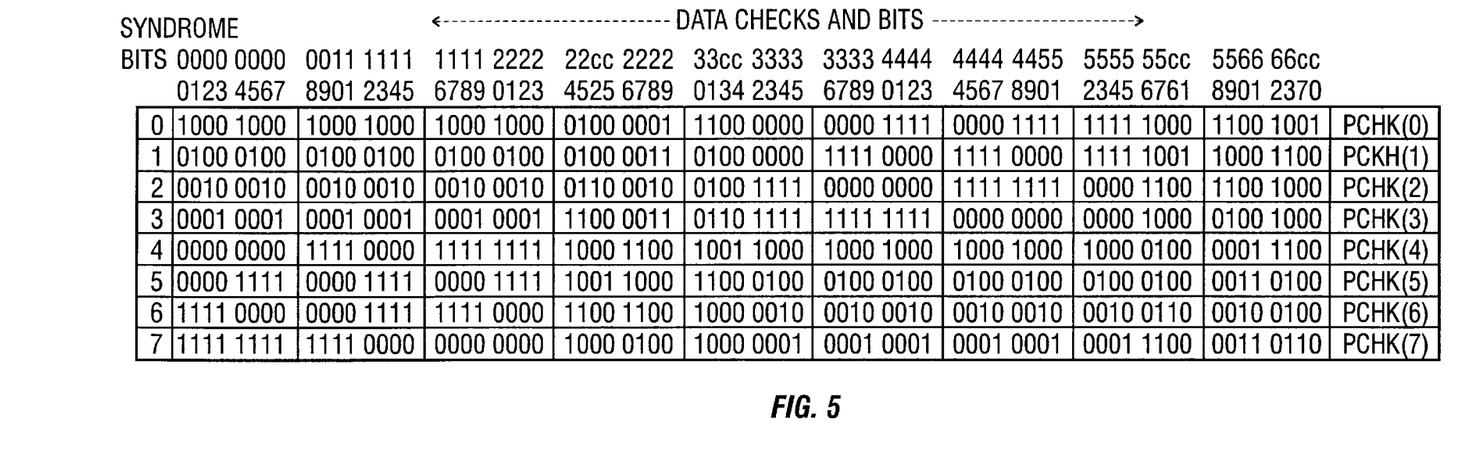
FIG. 5 is a data parity check matrix.

The check-bit generator 110 generates checks bits from the 64-bit write data according to a parity check matrix similar to that of the parity check matrix shown in FIG. 5. The only difference is that during check bit generation by the generator 110, the check bits CB[7:0] are not considered. Thus, each of the check bits is an exclusive OR of the data bits MD[63:0] associated with the value "1" and with the corresponding partial address check bit PCHK. For example, the check bit CB[0] is the exclusive OR of data bits MD 0, 4, 8, 12, 16, 20, 25, 29–31, 40–43, 48–56, 58, 59, and 62, and partial address check bit PCHK[0]. Similarly, the check bit CB[1] is the exclusive OR of data bits MD 1, 5, 9, 13, 17, 21, 25, 28, 29, 31, 36–39, 44–47, 52–56, 58, 62 and 63, and partial address check bit PCHK[1]. The check bits are provided to the input of an 8-bit buffer 114, which drives the check bit signals CB[7:0] onto the memory bus 27, and stored in the main memory 30 along with the write data.

If the write cycle is to fewer than all 8 bytes of the memory bus, then a read-merge-write cycle is performed. In a read-merge-write cycle, the data stored in the main memory 30 is first retrieved and provided to the input of the multiplexor 104 by the EDC circuit 102. The retrieved data corresponding to the bytes not written are then merged with the write data bytes from the latch 108 by the multiplexor 104 and presented as the write data at the output of the multiplexor 104. Thus, for example, if only bytes 0–3 and 6–7 are to be written to the main memory 30 (with bytes 4 and 5 remaining unchanged in the write operation), then the read-merge-write operation would retrieve bytes 4 and 5 from the memory, merge them with write bytes 0–3 and 6–7, and present the merged data at the output of the multiplexor 104.

Figure 3:
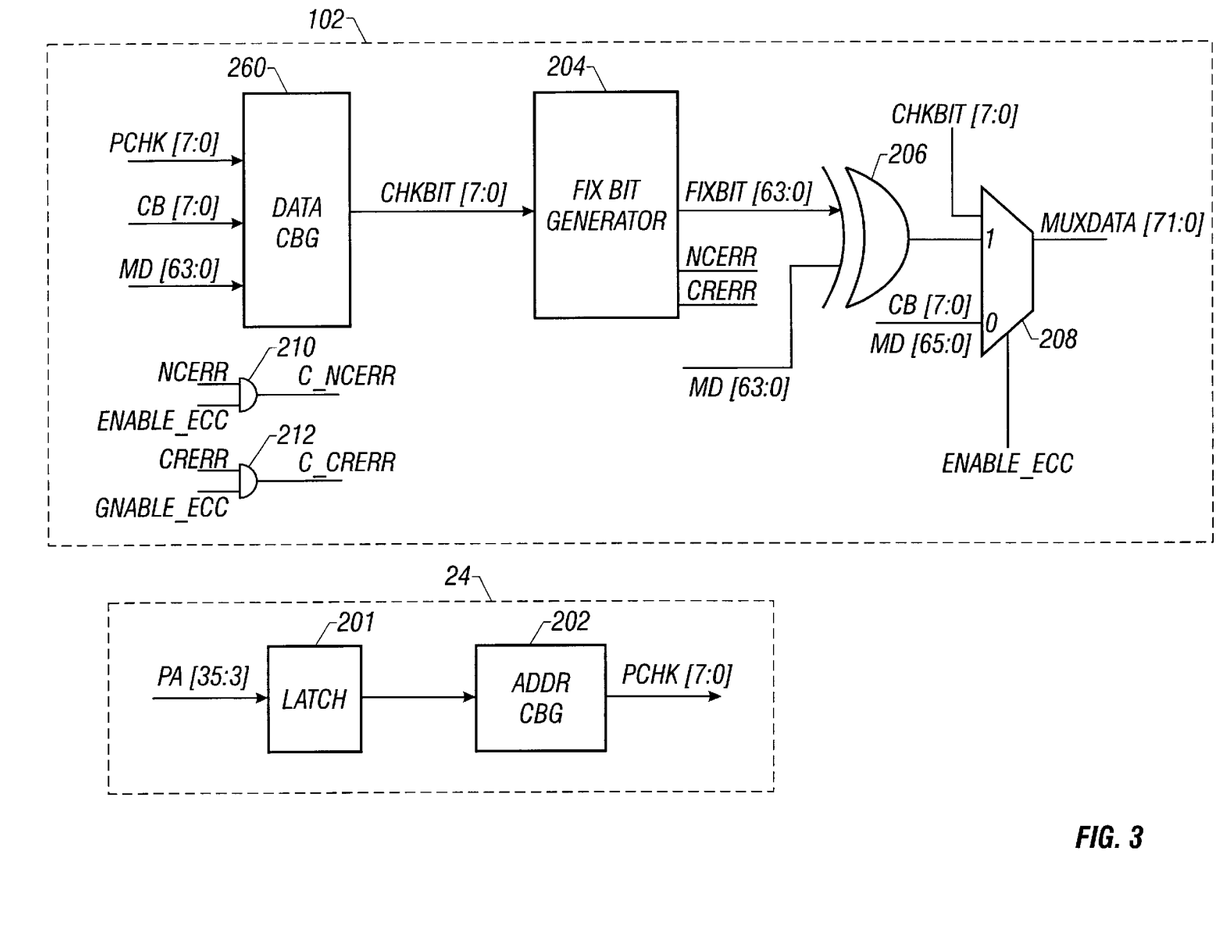
FIG. 3 is a schematic diagram of an error detection and correction device for a memory bus in the computer system.

Referring to FIG. 3, the EDC circuit 102 (FIG. 2) includes a syndrome bit generator 260 that receives partial address check bits PCHK[7:0], memory data check bits CB[7:0], and memory data bits MD[63:0]. The partial address check bits PCHK[7:0] are generated by an address check bit generator 202 in the address and control ASIC chip 24. The partial address check bits PCHK[7:0] are developed from memory address signals on processor address lines PA[35:3] (latched by a latch 201) based on the address parity check matrix shown in FIG. 4.

In some embodiments, all eight partial address check bits PCHK[7:0] are simultaneously received by eight input pins on the data ASIC chip 26. Alternatively, to reduce the number of pins on the data ASIC chip 26, four input pins can be used to receive the partial address check bits in two clock cycles. The two-clock period latency required to load the partial address check bits PCHK[7:0] into the data ASIC chip 26 would be less than the latency associated with a read access of the main memory 30.

The syndrome bit generator 260 generates syndrome bit signals CHKBIT[7:0] according to the data parity check matrix shown in FIG. 5. The syndrome bit signals CHKBIT [7:0] are provided to a fix bit generator 204, which generates fix bits FIXBIT[63:0] according to the syndrome table shown in FIG. 6. For a correctable single-bit data error, the corresponding one of the fix bits FIXBIT[63:0] is set high. A set of 64 exclusive OR gates 206 receiving the fix bits FIXBIT[63:0] and data bits MD[63:0] then flips the erroneous data bit by performing a bit-wise exclusive OR operation of the fix bits and memory data bits. For a no-error or uncorrectable error condition, the fix bits FIXBIT[63:0] are all zeros.

The corrected data bits from the exclusive OR gates 206, along with the bits CHKBIT[7:0], are provided to the 1 input of a multiplexor 208. The other input of the multiplexor 208 receives memory check bits CB[7:0] and memory data signals MD[63:0]. The multiplexor 208 selects between the corrected data and the uncorrected version of the data for output as MUXDATA[71:0], depending on whether a configuration signal ENABLE_ECC (output of an internal configuration register) is set high. The signal ENABLE_ECC is set high to enable error detection and correction. If the signal ENABLE_ECC is high, then the corrected data from the multiplexors 206 are output by the multiplexor 208.

The fix bit generator 204 also provides a signal CRERR (to indicate a correctable error has occurred), and a signal NCERR (to indicate a non-correctable error has occurred). The signal NCERR is gated with the signal ENABLE_ECC by an AND gate 210, which outputs a signal C_NCERR. The signal CRERR is gated with the signal ENABLE_ECC by an AND gate 212, which outputs a signal C_CRERR.

Once an error occurs, the interrupt controller 103 (FIG. 2) responds to assertion of either the C_NCERR or C_CRERR signals by generating an interrupt to the CPU 20 (FIG. 1). If the signal C_CRERR is asserted, the interrupt controller 103 asserts an interrupt request (IRQ) signal to indicate that a correctable error has occurred. When the interrupt is acknowledged, a software interrupt routine determines the proper procedure for informing the operator of the error, such as creating a log file listing all such correctable errors. If a non-correctable error occurs, the interrupt controller 103 initiates a non-maskable interrupt (NMI) to indicate to the CPU 20 that the data retrieved from memory is unreliable. The NMI software routine determines the proper courses of action following a non-correctable error, which include notifying the operator of such non-correctable error and/or notifying the application software of the error so that the erroneous read cycle can be retried.

When either the C_NCERR or C_CRERR signal is asserted, the syndrome bits are stored in a diagnostic register 105. The register 105 includes other diagnostic bits, including a bit which indicates whether the error occurred during a read cycle or a read-merge-write cycle. Further, the memory address associated with the error condition is also stored in another diagnostic register in the address and control ASIC 24. The bits stored in the diagnostic registers are accessible by the CPU 20 under control of an interrupt handler routine.

Figure 4:
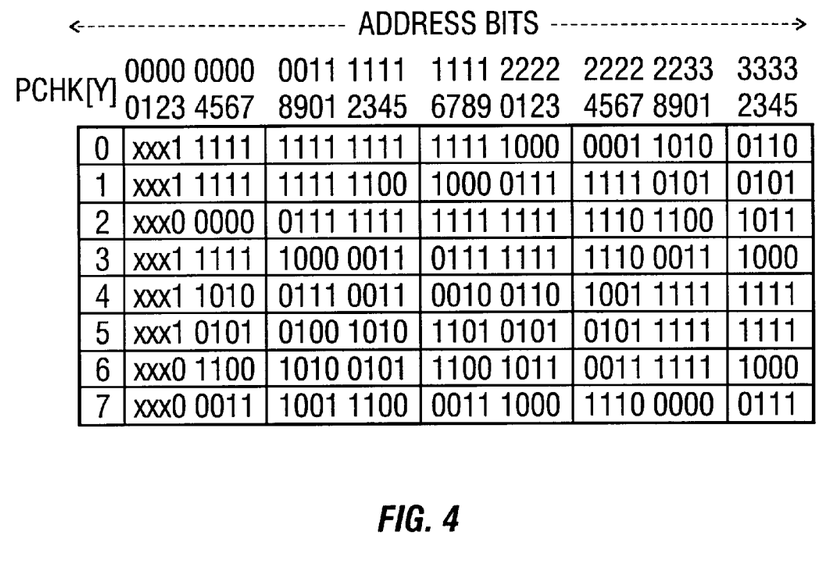
FIG. 4 is an address parity check matrix.

Referring to FIG. 4, the memory address parity check matrix shows how the partial address check bits PCHK[7:0] are generated from memory address bits PA[35:3]. A partial address check bit PCHK[Y] (Y=0 to 7) is generated by performing an exclusive OR operation of the address bits associated with the value "1". Thus, for example, the partial address check bit PCHK[0] is generated by performing an exclusive OR operation of address bits PA 3–20, 27, 28, 30, 33, and 34. Partial address check bit PCHK[1] is generated by performing an exclusive OR operation of address bits PA 3–13, 16, 21–27, 29, 31, 33, and 35. The other partial address check bits are generated in similar fashion.

If it is desired that address detection be disabled, then the contacts of the address parity check matrix can be set to all zeros. This will cause the partial address check bits PCHK [7:0] to be all zeros.

Referring to FIG. 5, the memory data and address parity check matrix shows how the syndrome bit signals CHKBIT [7:0] are generated. A syndrome bit CHKBIT[Y] (Y=0 to 7) is generated by performing an exclusive OR operation of all memory data bits MD[63:0] associated with a value "1", the check bits CB[7:0] associated with a value "1", and the partial address check bit PCHK[Y]. Thus, for example, the syndrome bit CHKBIT[0] is generated by performing an exclusive OR operation of memory data bits MD 0, 4, 8, 12, 16, 20, 25, 29–31, 40–43, 48–56, 58, 59, and 62, check bit CB[0], and partial address check bit PCHK[0]. Similarly, the syndrome bit CHKBIT[1] is generated by performing an exclusive OR operation of data bits MD 1, 5, 9, 13, 17, 21, 25, 28, 29, 31, 36–39, 44–47, 52–56, 58, 62 and 63, check bit CB[1], and partial address check bit PCHK[1].

Referring to FIG. 6, the syndrome bit signals CHKBIT [7:0] map into the syndrome table shown. The 8 syndrome bits can represent 256 possible values, which are used to map into 256 possible positions in the syndrome table. Each of the 256 positions in the syndrome table contains 2 entries, the first entry being the hexadecimal value of the syndrome bit signals CHKBIT[7:0], and the second entry indicating the error condition associated with the memory or address data. Thus, for example, a hexadecimal value 00 indicates a no-error condition, a hexadecimal value 01 indicates an error in check bit CB[0], a hexadecimal value 02 indicates an error in check bit CB[1], a hexadecimal value 03 indicates an uncorrectable error, and so forth. Single-bit errors associated with the memory data MD[63:0] and check bits CB[7:0] are correctable through use of the syndrome table. However, multiple-bit errors in the memory data and check bit signals and all memory address errors are mapped into uncorrectable positions in the syndrome table.

Thus, by using eight check bits, the EDC circuit 102 performs error detection and correction of memory data and check bits as well as memory address error detection.

One advantage offered by the described system is that additional parity bits or check bits (other than check bits used for data and check bit error detection and correction) are not needed to perform the memory address error detection, which reduces the hardware costs associated with additional memory space. A further advantage is that use of the check bits allow for detection of double address bit errors, whereas use of a parity bit is limited to detection of odd-numbered address bit errors.

Figure 7:
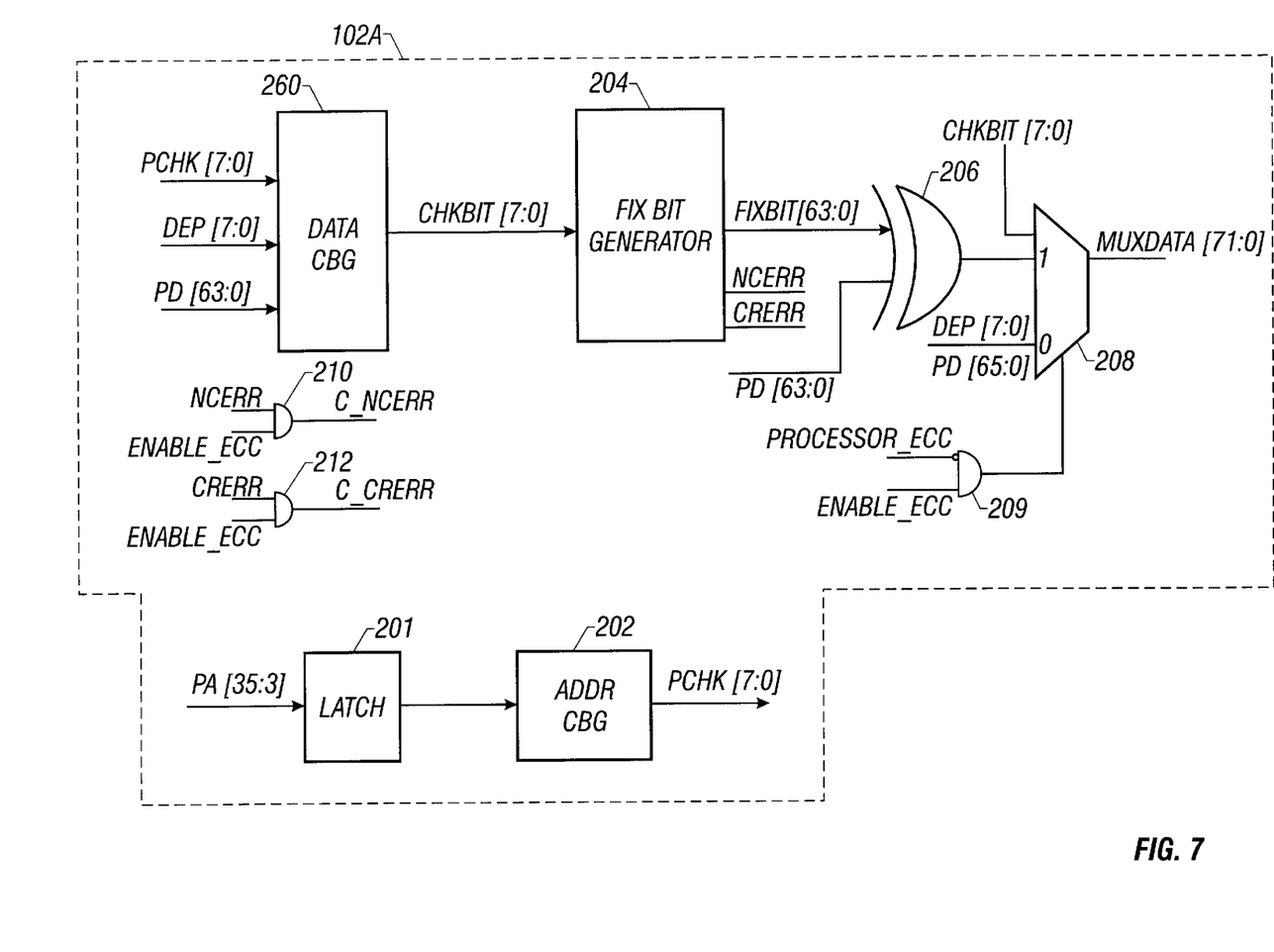
FIG. 7 is a schematic diagram of an error detection and correction device for a processor bus in the computer system.

The error detection and correction system described above can also be extended to the processor bus 21 with modifications. A second level of checking would then be performed to detect errors on the processor address and data buses. Referring to FIG. 7, the error detection and correction system 102A receives processor data bits PD[63:0], address bits PA[35:3], and check bits CB[7:0] (currently on bits DEP[7:0]). The output of an AND gate 209 (which receives the signal ENABLE_ECC and the inverted state of the signal PROCESSOR_ECC) is provided to the multiplexor 208 instead of the signal ENABLE_ECC being provided directly to the multiplexor 208 as shown in FIG. 3.

The error detection and correction system 102A can be contained in the CPU-PCI bridge 22. If the signal PROCESSOR_ECC is asserted high, indicating that the EDC system is associated with the processor bus 21, then the data and check bit correction feature is disabled and only data, check bit, and address error detection is enabled. If the processor bus 21 is so protected, the parity bits used to protect the processor address bus can be eliminated since the processor check bits on the processor bus 21 would be used to detect errors in the processor address bus.

If an error is detected on the processor bus 21, the fix bit generator 204 asserts signals NCERR and CRERR, which in turn causes the AND gates 210 and 212 to assert signals C_NCERR and C_CRERR high to notify the CPU 20 that an error condition has occurred.

Error detection and correction on the processor bus 21 must be disabled in certain system boards with the existing Pentium® Pro processor. The ECC algorithm of the Pentium® Pro processor can detect single-bit errors, detect double-bit errors, and detect errors confined to one nibble (i.e., four bits) of the processor data lines. On the processor bus of some system boards, isolation is not provided for between nibbles of the processor data lines. As a result, cross-talk may occur between the adjacent data lines in neighboring nibbles. For example, data line PD[3] of nibble PD[3:0] may cross-talk with data line PD[4] of nibble PD[7:4]. Such cross-talk could cause the ECC algorithm of the Pentium® Pro to perform an erroneous correction of data bits. To prevent such error, system boards have to disable the error detection and correction of the processor data lines.

Figure 8A:
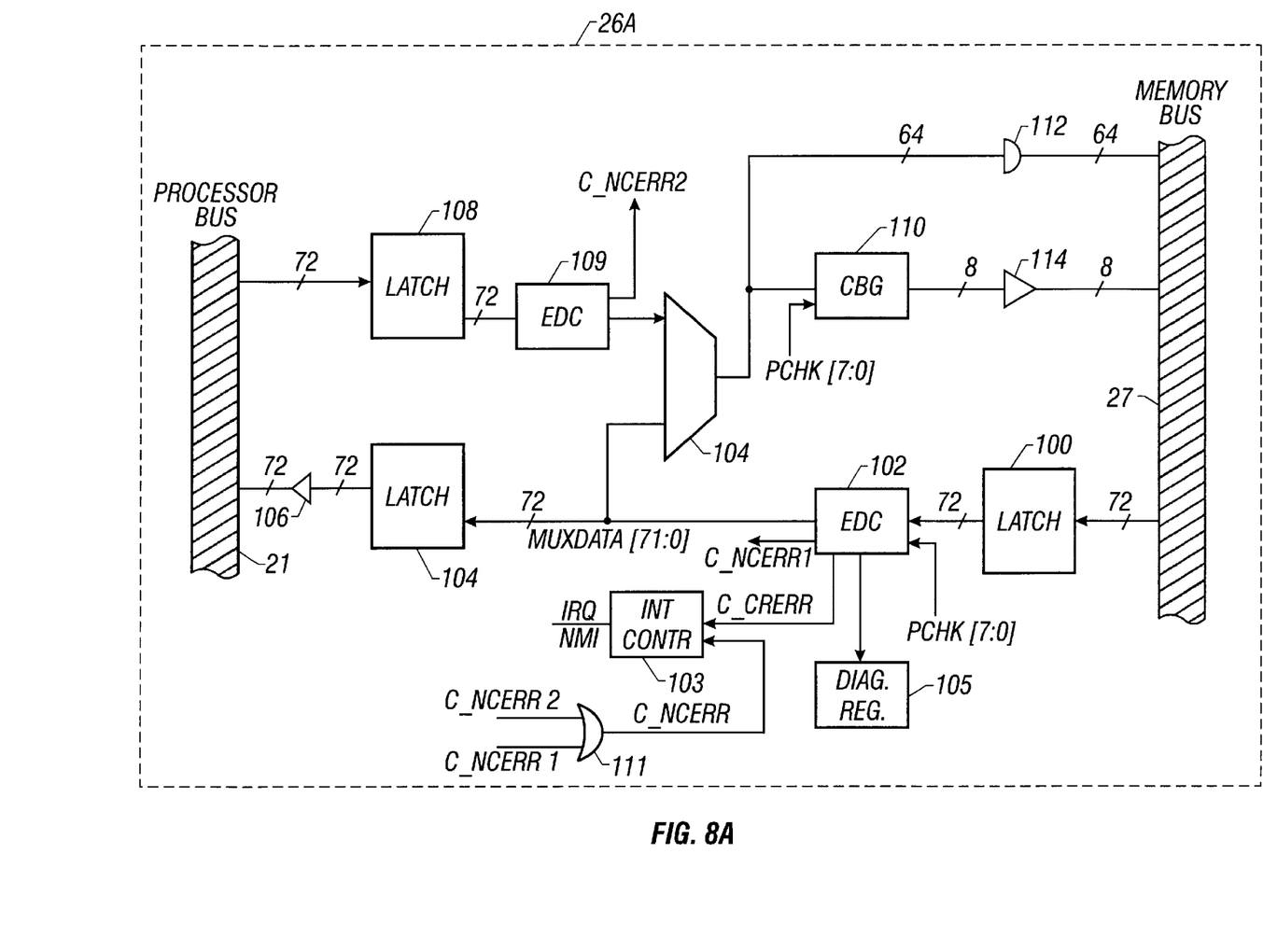
FIGS. 8A and 8B are schematic diagrams of a data ASIC chip which performs error detection of processor data lines.
Figure 8B:
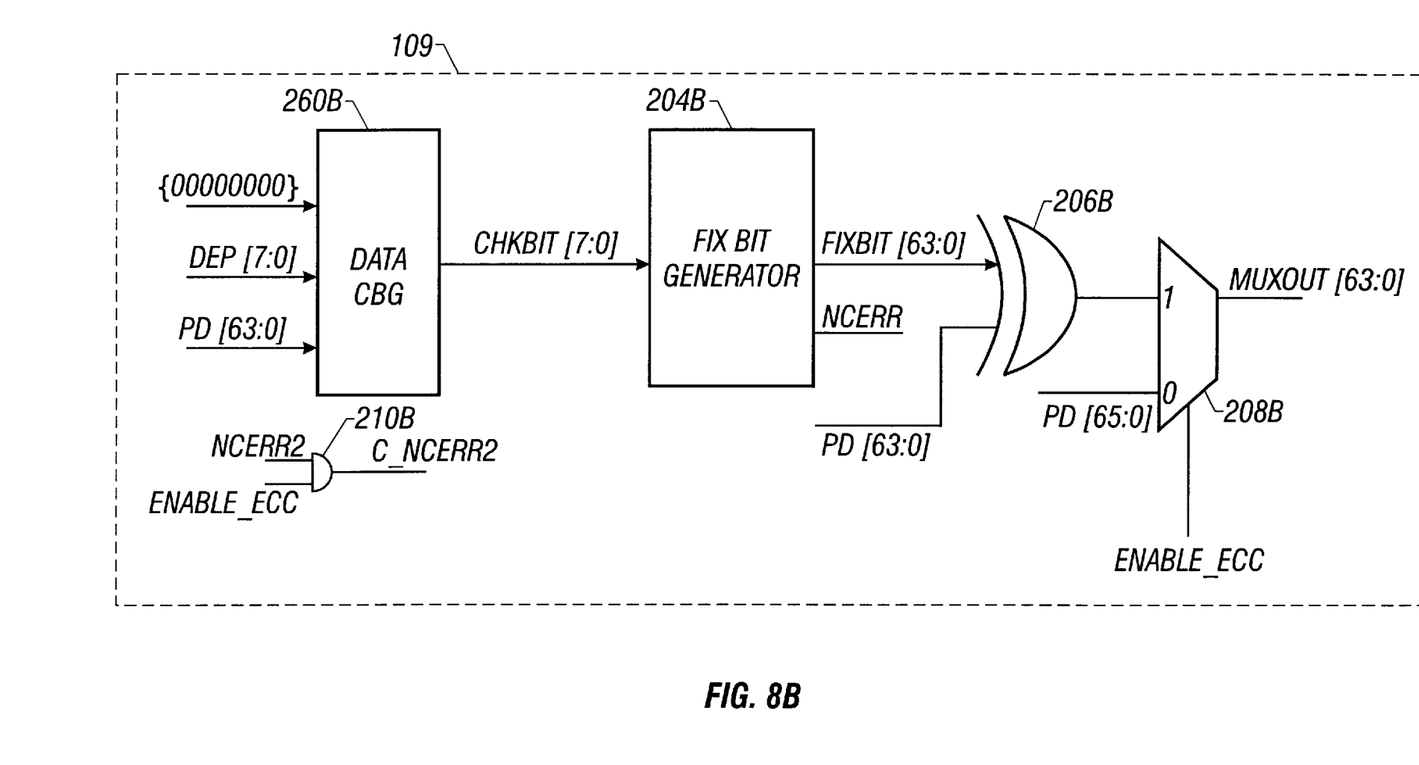

Referring to FIGS. 8A and 8B, a modified data ASIC chip 26A is used to enable error detection of the processor data lines using the CPU ECC bits DEP[7:0] while the data error correction remains disabled. The ECC bits DEP[7:0] can be ECC bits generated by the Pentium® Pro processor. By using ECC bits DEP[7:0] to detect (and not correct) processor data line errors, the system retains its ability to detect single-bit errors, double-bit errors, or multiple-bit errors in a nibble.

In FIG. 8A, the components of the modified data ASIC 26A that are common with the components of the data ASIC chip 26 in FIG. 2 have the same reference numerals. Only the changes will be described below, which include the addition of an EDC circuit 109 between the output of a 72-bit latch 108A and the input of the multiplexor 104. The EDC circuit 109 receives latched processor data lines [63:0] and check bits DEP[7:0], and provides uncorrected data bits MUXOUT[63:0] to one input of the multiplexor 104.

The EDC circuit 109 is shown in FIG. 8B, and includes a syndrome bit generator 260B and a fix bit generator 204B. The syndrome table used by the syndrome bit generator 260B of the EDC circuit 109 receives eight "0s" instead of the partial check bits PCHK[7:0] received in the EDC circuit 102. The syndrome bit generator 260B of the EDC circuit 109 generates syndrome bits CHKBIT[7:0] according to a parity check matrix similar to that shown in FIG. 5, with the column containing PCHK[7:0] substituted with "0s". A further difference in the EDC circuit 109 is that the fix bit generator 204B uses a modified syndrome table (i.e., modified from the table of FIG. 6) in which all the entries of the syndrome table are mapped to uncorrectable errors except for entry "00". Consequently, the EDC circuit 109 can perform only processor data line error detection, with the error correction disabled. Any error in the processor data lines PD[63:0] or check bits DEP[7:0] detectable by the EDC circuit 109 will result in the fix bit generator 204B asserting a signal NCERR2. The signal NCERR2 is provided to the AND gate 210B, which drives a signal C_NCERR2.

In FIG. 8A, the signal C_NCERR2 from the EDC circuit 109 is provided to an input of a two-input OR gate 111. The other input of the OR gate 111 receives a signal C_NCERR1 from the EDC circuit 102 for a memory data uncorrectable error. The output of the OR gate 111 provides the signal C_NCERR to the interrupt controller 103 for generating interrupts to the CPU 20.

Effectively, the circuitry of FIGS. 8A and 8B disables error correction of the processor data lines PD[63:0] while maintaining the ability to detect processor data line errors using the ECC bits DEP[7:0].

Other embodiments are within the scope of the following claims. For example, the error detection and correction system can be used in connection with other types of storage devices, including mass storage systems such as hard disk drives. In addition, the error detection and correction system can also be extended to other types of buses, such as Extended Industry Standard Architecture (EISA) or Industry Standard Architecture (ISA) expansion bus. Further, the data ASIC chip and address and control ASIC chip can be implemented with discrete logic components, in integrated controllers, such as a microcontroller, or as firmware.

What is claimed is:

1. A computer system, comprising:
    a processor bus having processor data and processor check bits to perform error detection and correction of the processor data;
    a CPU coupled to the processor bus; and,
    a memory sub-system coupled to the processor bus, including:
        memory check bits, memory address bits, and memory data bits; and
        an error detection and correction device to detect an error in the memory address bits using the memory check bits and to detect and correct an error in the memory data bits using the memory check bits, including:
            a decoder receiving the memory check bits, memory address bits, and memory data bits to generate an indication that a memory address or data error has occurred using the memory check bits; and
            a correction circuit to correct the data bits if a correctable memory data error is present;
    wherein the error detection and correction device further includes a partial address check bit generator to generate partial address check bits based on the memory address bits, and wherein the decoder further receives the partial address check bits to determine if a memory address or data error has occurred; and
    wherein the memory sub-system includes 36 or less memory address bits, and wherein the partial address check bit generator generates 8 partial address check bits PCHK[7.0] according to the following address parity check matrix:

| PCHK[Y] | ← Address Bits → | | | | |
|---|---|---|---|---|---|
| | 0000 0000 0123 4567 | 0011 1111 8901 2345 | 1111 2222 6789 0123 | 2222 2233 4567 8901 | 3333 2345 |
| 0 | xxx1 1111 | 1111 1111 | 1111 1000 | 0001 1010 | 0110 |
| 1 | xxx1 1111 | 1111 1100 | 1000 0111 | 1111 0101 | 0101 |
| 2 | xxx0 0000 | 0111 1111 | 1111 1111 | 1110 1100 | 1011 |
| 3 | xxx1 1111 | 1000 0011 | 0111 1111 | 1110 0011 | 1000 |
| 4 | xxx1 1010 | 0111 0011 | 0010 0110 | 1001 1111 | 1111 |
| 5 | xxx1 0101 | 0100 1010 | 1101 0101 | 0101 1111 | 1111 |
| 6 | xxx0 1100 | 1010 0101 | 1100 1011 | 0011 1111 | 1000 |
| 7 | xxx0 0011 | 1001 1100 | 0011 1000 | 1110 0000 | 0111. |

2. The computer system of claim 1, wherein the memory sub-system includes 64 or less memory data bits and 8 memory check bits, wherein the decoder generates 8 syndrome bits, and wherein the 8 syndrome bits are generated according to the following data parity-check matrix:

| SYNDROME BIT[Y] | ←---------- Data and Check Bits ----------> | | | | | | | | | | | | | | | | | |
|---|---|---|---|---|---|---|---|---|---|---|---|---|---|---|---|---|---|---|
| | 0000 0123 | 0000 4567 | 0011 8901 | 1111 2345 | 1111 6789 | 2222 0123 | 22cc 4525 | 2222 6789 | 33cc 0134 | 3333 2345 | 3333 6789 | 4444 0123 | 4444 4567 | 4455 8901 | 5555 2345 | 55cc 6761 | 5566 8901 | 66cc 2370 | |
| 0 | 1000 | 1000 | 1000 | 1000 | 1000 | 1000 | 0100 | 0001 | 1100 | 0000 | 0000 | 1111 | 0000 | 1111 | 1111 | 1000 | 1100 | 1001 | PCHK[0] |
| 1 | 0100 | 0100 | 0100 | 0100 | 0100 | 0100 | 0100 | 0011 | 0100 | 0000 | 1111 | 0000 | 1111 | 0000 | 1111 | 1001 | 1000 | 1100 | PCHK[1] |
| 2 | 0010 | 0010 | 0010 | 0010 | 0010 | 0010 | 0110 | 0010 | 0100 | 1111 | 0000 | 0000 | 1111 | 1111 | 0000 | 1100 | 1100 | 1000 | PCHK[2] |
| 3 | 0001 | 0001 | 0001 | 0001 | 0001 | 0001 | 1100 | 0011 | 0110 | 1111 | 1111 | 1111 | 0000 | 0000 | 0000 | 1000 | 0100 | 1000 | PCHK[3] |
| 4 | 0000 | 0000 | 1111 | 0000 | 1111 | 1111 | 1000 | 1100 | 1001 | 1000 | 1000 | 1000 | 1000 | 1000 | 0100 | 0001 | 1100 | PCHK[4] |
| 5 | 0000 | 1111 | 0000 | 1111 | 0000 | 1111 | 1001 | 1000 | 1100 | 0100 | 0100 | 0100 | 0100 | 0100 | 0100 | 0011 | 0100 | PCHK[5] |
| 6 | 1111 | 0000 | 0000 | 1111 | 1111 | 0000 | 1100 | 1100 | 1000 | 0010 | 0010 | 0010 | 0010 | 0010 | 0110 | 0010 | 0100 | PCHK[6] |
| 7 | 1111 | 1111 | 1111 | 0000 | 0000 | 0000 | 1000 | 0100 | 1000 | 0001 | 0001 | 0001 | 0001 | 0001 | 1100 | 0011 | 0110 | PCHK[7]. |

3. The computer system of claim 2, wherein the error detection and correction device performs the error detection and correction according to the following syndrome table, an entry in the syndrome table being selected by a hexadecimal value of the syndrome bits:

| | | | | | | | | | | | | | | | |
|---|---|---|---|---|---|---|---|---|---|---|---|---|---|---|---|
| 00 | No Error | 20 | CB5 | 40 | CB6 | 60 | UNCER | 80 | CB7 | A0 | UNCER | C0 | UNCER | E0 | DB60 |
| 01 | CB0 | 21 | UNCER | 41 | UNCER | 61 | DB12 | 81 | UNCER | A1 | DB4 | C1 | DB0 | E1 | UNCER |
| 02 | CB1 | 22 | UNCER | 42 | UNCER | 62 | DB13 | 82 | UNCER | A2 | DB5 | C2 | DB1 | E2 | UNCER |
| 03 | UNCER | 23 | DB53 | 43 | DB54 | 63 | UNCER | 83 | DB55 | A3 | UNCER | C3 | UNCER | E3 | UNCER |
| 04 | CB2 | 24 | UNCER | 44 | UNCER | 64 | DB14 | 84 | UNCER | A4 | DB6 | C4 | DB2 | E4 | UNCER |
| 05 | UNCER | 25 | DB49 | 45 | DB50 | 65 | UNCER | 85 | DB51 | A5 | UNCER | C5 | UNCER | E5 | UNCER |
| 06 | UNCER | 26 | DB45 | 46 | DB46 | 66 | UNCER | 86 | DB47 | A6 | UNCER | C6 | UNCER | E6 | UNCER |
| 07 | DB58 | 27 | UNCER | 47 | UNCER | 67 | UNCER | 87 | UNCER | A7 | UNCER | C7 | UNCER | E7 | UNCER |
| 08 | CB3 | 28 | UNCER | 48 | UNCER | 68 | DB15 | 88 | UNCER | A8 | DB7 | C8 | DB3 | E8 | UNCER |
| 09 | UNCER | 29 | DB41 | 49 | DB42 | 69 | UNCER | 89 | DB43 | A9 | UNCER | C9 | UNCER | E9 | UNCER |
| 0A | UNCER | 2A | DB37 | 4A | DB38 | 6A | UNCER | 8A | DB39 | AA | UNCER | CA | UNCER | EA | UNCER |
| 0B | DB29 | 2B | UNCER | 4B | UNCER | 6B | UNCER | 8B | UNCER | AB | UNCER | CB | UNCER | EB | UNCER |
| 0C | UNCER | 2C | DB33 | 4C | DB34 | 6C | UNCER | 8C | DB35 | AC | UNCER | CC | UNCER | EC | UNCER |
| 0D | DB59 | 2D | UNCER | 4D | UNDER | 6D | UNCER | 8D | UNCER | AD | UNCER | CD | UNCER | ED | UNCER |
| 0E | DB28 | 2E | UNCER | 4E | UNCER | 6E | UNCER | 8E | UNCER | AE | UNCER | CE | UNCER | EE | UNCER |
| 0F | UNCER | 2F | DB31 | 4F | DB25 | 6F | UNCER | 8F | DB56 | AF | UNCER | CF | UNCER | EF | UNCER |
| 10 | CB4 | 30 | UNCER | 50 | UNCER | 70 | DB26 | 90 | UNCER | B0 | DB61 | D0 | DB27 | F0 | UNCER |
| 11 | UNCER | 31 | DB20 | 51 | DB16 | 71 | UNCER | 91 | DB8 | B1 | UNCER | D1 | UNCER | F1 | DB30 |
| 12 | UNCER | 32 | DB21 | 52 | DB17 | 72 | UNCER | 92 | DB9 | B2 | UNCER | D2 | UNCER | F2 | DB63 |
| 13 | DB52 | 33 | UNCER | 53 | UNCER | 73 | UNCER | 93 | UNCER | B3 | UNCER | D3 | UNCER | F3 | UNCER |
| 14 | UNCER | 34 | DB22 | 54 | DB18 | 74 | UNCER | 94 | DB10 | B4 | UNCER | D4 | UNCER | F4 | DB57 |
| 15 | DB48 | 35 | UNCER | 55 | UNCER | 75 | UNCER | 95 | UNCER | B5 | UNCER | D5 | UNCER | F5 | UNCER |
| 16 | DB44 | 36 | UNCER | 56 | UNCER | 76 | UNCER | 96 | UNCER | B6 | UNCER | D6 | UNCER | F6 | UNCER |
| 17 | UNCER | 37 | UNCER | 57 | UNCER | 77 | UNCER | 97 | UNCER | B7 | UNCER | D7 | UNCER | F7 | UNCER |
| 18 | UNCER | 38 | DB23 | 58 | DB19 | 78 | UNCER | 98 | DB11 | B8 | UNCER | D8 | UNCER | F8 | DB24 |
| 19 | DB40 | 39 | UNCER | 59 | UNCER | 79 | UNCER | 99 | UNCER | B9 | UNCER | D9 | UNCER | F9 | UNCER |
| 1A | DB36 | 3A | UNCER | 5A | UNCER | 7A | UNCER | 9A | UNCER | BA | UNCER | DA | UNCER | FA | UNCER |
| 1B | UNCER | 3B | UNCER | 5B | UNCER | 7B | UNCER | 9B | UNCER | BB | UNCER | DB | UNCER | FB | UNCER |
| 1C | DB32 | 3C | UNCER | 5C | UNCER | 7C | UNCER | 9C | UNCER | BC | UNCER | DC | UNCER | FC | UNCER |
| 1D | UNCER | 3D | UNCER | 5D | UNCER | 7D | UNCER | 9D | UNCER | BD | UNCER | DD | UNCER | FD | UNCER |
| 1E | UNCER | 3E | UNCER | 5E | UNCER | 7E | UNCER | 9E | UNCER | BE | UNCER | DE | UNCER | FE | UNCER |
| 1F | DB62 | 3F | UNCER | 5F | UNCER | 7F | UNCER | 9F | UNCER | BF | UNCER | DF | UNCER | FF | UNCER. |

4. The computer system of claim 1, wherein the CPU includes a processor from the Pentium® Pro family of processors.

5. The computer system of claim 1, wherein the memory sub-system includes 64 or less memory data bits and 8 memory check bits.

6. The computer system of claim 5, wherein the memory sub-system includes 36 or less memory address bits.

7. The computer system of claim 1, wherein the error detection and correction device generates a syndrome table which includes a plurality of entries mapped to correctable or uncorrectable errors, and wherein a detected multiple-bit error in the memory data bits is mapped to an uncorrectable error entry and detected error in the memory address bits is mapped to an uncorrectable error entry.

8. A computer system comprising:

a CPU;

a processor bus coupled to the CPU having address bits, data bits, and check bits; and an error detection device coupled to the processor bus to detect an error in the address bits or data bits using the check bits, wherein the error detection device includes a decoder receiving the check bits, the decoder being selectable operable to detect either an even number of erroneous bits or an odd number of erroneous bits in the address bits.

9. The computer system of claim 8, further comprising:

a memory sub-system coupled to the CPU and including: memory check bits, memory address bits, and a memory data bits; and an error detection and correction device to detect an error in the memory address bits using the check bits and to detect and correct an error in the memory data bits using the memory check bits.

10. The computer system of claim 8, wherein the error detection and correction device includes:

a decoder receiving the memory check bits, memory address bits, and memory data bits to generate an indication that a memory address or data error has occurred using the memory check bits; and a correction circuit to correct the data bits if a correctable memory data error is present.

11. The computer system of claim 10, wherein the error detection and correction device further includes a partial address check bit generator to generate partial address check bits based on the memory address bits, and wherein the decoder further receives the partial address check bits to determine if a memory address or data error has occurred.

12. The computer system of claim 11, wherein the memory sub-system includes 36 or less memory address bits, and wherein the partial address check bit generator generates 8 partial address check bits PCHK[7:0] according to the following address parity check matrix:

| | <----------------------------------Address Bits----------------------------------> | | | | | | | |
|---|---|---|---|---|---|---|---|---|
| | 0000 | 0000 | 0011 | 1111 | 1111 | 2222 | 2222 | 2233 | 3333 |
| | 0123 | 4567 | 8901 | 2345 | 6789 | 0123 | 4567 | 8901 | 2345 |
| PCHK[Y] | | | | | | | | | |
| 0 | xxx1 | 1111 | 1111 | 1111 | 1111 | 1000 | 0001 | 1010 | 0110 |
| 1 | xxx1 | 1111 | 1111 | 1100 | 1000 | 0111 | 1111 | 0101 | 0101 |

-continued

| | | | | | | | | |
|---|---|---|---|---|---|---|---|---|
| 2 | xxx0 | 0000 | 0111 | 1111 | 1111 | 1110 | 1100 | 1011 |
| 3 | xxx1 | 1111 | 1000 | 0011 | 0111 | 1110 | 0011 | 1000 |
| 4 | xxx1 | 1010 | 0111 | 0011 | 0010 | 0110 | 1001 | 1111 | 1111 |
| 5 | xxx1 | 0101 | 0100 | 1010 | 1101 | 0101 | 0101 | 1111 | 1111 |
| 6 | xxx0 | 1100 | 1010 | 0101 | 1100 | 1011 | 0011 | 1111 | 1000 |
| 7 | xxx0 | 0011 | 1001 | 1100 | 0011 | 1000 | 1110 | 0000 | 0111. |

13. The computer system of claim 12, wherein the memory sub-system includes 64 or less memory data bits and 8 memory check bits, and wherein the 8 check bits are generated according to the following data parity-check matrix:

<-------------Data and Check Bits---------->

| | | | | | | | | | | | | | | | | | | |
|---|---|---|---|---|---|---|---|---|---|---|---|---|---|---|---|---|---|---|
| | 0000 | 0000 | 0011 | 1111 | 1111 | 2222 | 22cc | 2222 | 33cc | 3333 | 3333 | 4444 | 4444 | 4455 | 5555 | 55cc | 5566 | 66cc | |
| | 0123 | 4567 | 8901 | 2345 | 6789 | 0123 | 4525 | 6789 | 0134 | 2345 | 6789 | 0123 | 4567 | 8901 | 2345 | 6761 | 8901 | 2370 | |
| CHECK BIT[Y] | | | | | | | | | | | | | | | | | | | |
| 0 | 1000 | 1000 | 1000 | 1000 | 1000 | 1000 | 0100 | 0001 | 1100 | 0000 | 0000 | 1111 | 0000 | 1111 | 1111 | 1000 | 1100 | 1001 | PCHK[0] |
| 1 | 0100 | 0100 | 0100 | 0100 | 0100 | 0100 | 0100 | 0011 | 0100 | 0000 | 1111 | 0000 | 1111 | 0000 | 1111 | 1001 | 1000 | 1100 | PCHK[1] |
| 2 | 0010 | 0010 | 0010 | 0010 | 0010 | 0010 | 0110 | 0010 | 0100 | 1111 | 0000 | 0000 | 1111 | 1111 | 0000 | 1100 | 1100 | 1000 | PCHK[2] |
| 3 | 0001 | 0001 | 0001 | 0001 | 0001 | 0001 | 1100 | 0011 | 0110 | 1111 | 1111 | 1111 | 0000 | 0000 | 0000 | 1000 | 0100 | 1000 | PCHK[3] |
| 4 | 0000 | 0000 | 1111 | 0000 | 1111 | 1111 | 1000 | 1100 | 1001 | 1000 | 1000 | 1000 | 1000 | 1000 | 1000 | 0100 | 0001 | 1100 | PCHK[4] |
| 5 | 0000 | 1111 | 0000 | 1111 | 0000 | 1111 | 1001 | 1000 | 1100 | 0100 | 0100 | 0100 | 0100 | 0100 | 0100 | 0100 | 0011 | 0100 | PCHK[5] |
| 6 | 1111 | 0000 | 0000 | 1111 | 1111 | 0000 | 1100 | 1100 | 1000 | 0010 | 0010 | 0010 | 0010 | 0010 | 0010 | 0110 | 0010 | 0100 | PCHK[6] |
| 7 | 1111 | 1111 | 1111 | 0000 | 0000 | 0000 | 1000 | 0100 | 1000 | 0001 | 0001 | 0001 | 0001 | 0001 | 0001 | 1100 | 0011 | 0110 | PCHK[7]. |

14. The computer system of claim 13, wherein the error detection and correction device performs the error detection and correction according to the following syndrome table, an entry in the syndrome table being selected by a hexadecimal value of the syndrome bits:

15. The computer system of claim 8, wherein the CPU includes a processor from the Pentium® Pro family of processors.

16. The computer system of claim 8, wherein the memory sub-system includes 64 or less memory data bits and 8 memory check bits.

| | | | | | | | | | | | | | | | | |
|---|---|---|---|---|---|---|---|---|---|---|---|---|---|---|---|---|
| 00 | No Error | 20 | CB5 | 40 | CB6 | 60 | UNCER | 80 | CB7 | A0 | UNCER | C0 | UNCER | E0 | DB60 |
| 01 | CB0 | 21 | UNCER | 41 | UNCER | 61 | DB12 | 81 | UNCER | A1 | DB4 | C1 | DB0 | E1 | UNCER |
| 02 | CB1 | 22 | UNCER | 42 | UNCER | 62 | DB13 | 82 | UNCER | A2 | DB5 | C2 | DB1 | E2 | UNCER |
| 03 | UNCER | 23 | DB53 | 43 | DB54 | 63 | UNCER | 83 | DB55 | A3 | UNCER | C3 | UNCER | E3 | UNCER |
| 04 | CB2 | 24 | UNCER | 44 | UNCER | 64 | DB14 | 84 | UNCER | A4 | DB6 | C4 | DB2 | E4 | UNCER |
| 05 | UNCER | 25 | DB49 | 45 | DB50 | 65 | UNCER | 85 | DB51 | A5 | UNCER | C5 | UNCER | E5 | UNCER |
| 06 | UNCER | 26 | DB45 | 46 | DB46 | 66 | UNCER | 86 | DB47 | A6 | UNCER | C6 | UNCER | E6 | UNCER |
| 07 | DB58 | 27 | UNCER | 47 | UNCER | 67 | UNCER | 87 | UNCER | A7 | UNCER | C7 | UNCER | E7 | UNCER |
| 08 | CB3 | 28 | UNCER | 48 | UNCER | 68 | DB15 | 88 | UNCER | A8 | DB7 | C8 | DB3 | E8 | UNCER |
| 09 | UNCER | 29 | DB41 | 49 | DB42 | 69 | UNCER | 89 | DB43 | A9 | UNCER | C9 | UNCER | E9 | UNCER |
| 0A | UNCER | 2A | DB37 | 4A | DB38 | 6A | UNCER | 8A | DB39 | AA | UNCER | CA | UNCER | EA | UNCER |
| 0B | DB29 | 2B | UNCER | 4B | UNCER | 6B | UNCER | 8B | UNCER | AB | UNCER | CB | UNCER | EB | UNCER |
| 0C | UNCER | 2C | DB33 | 4C | DB34 | 6C | UNCER | 8C | DB35 | AC | UNCER | CC | UNCER | EC | UNCER |
| 0D | DB59 | 2D | UNCER | 4D | UNDER | 6D | UNCER | 8D | UNCER | AD | UNCER | CD | UNCER | ED | UNCER |
| 0E | DB28 | 2E | UNCER | 4E | UNCER | 6E | UNCER | 8E | UNCER | AE | UNCER | CE | UNCER | EE | UNCER |
| 0F | UNCER | 2F | DB31 | 4F | DB25 | 6F | UNCER | 8F | DB56 | AF | UNCER | CF | UNCER | EF | UNCER |
| 10 | CB4 | 30 | UNCER | 50 | UNCER | 70 | DB26 | 90 | UNCER | B0 | DB61 | D0 | DB27 | F0 | UNCER |
| 11 | UNCER | 31 | DB20 | 51 | DB16 | 71 | UNCER | 91 | DB8 | B1 | UNCER | D1 | UNCER | F1 | DB30 |
| 12 | UNCER | 32 | DB21 | 52 | DB17 | 72 | UNCER | 92 | DB9 | B2 | UNCER | D2 | UNCER | F2 | DB63 |
| 13 | DB52 | 33 | UNCER | 53 | UNCER | 73 | UNCER | 93 | UNCER | B3 | UNCER | D3 | UNCER | F3 | UNCER |
| 14 | UNCER | 34 | DB22 | 54 | DB18 | 74 | UNCER | 94 | DB10 | B4 | UNCER | D4 | UNCER | F4 | DB57 |
| 15 | DB48 | 35 | UNCER | 55 | UNCER | 75 | UNCER | 95 | UNCER | B5 | UNCER | D5 | UNCER | F5 | UNCER |
| 16 | DB44 | 36 | UNCER | 56 | UNCER | 76 | UNCER | 96 | UNCER | B6 | UNCER | D6 | UNCER | F6 | UNCER |
| 17 | UNCER | 37 | UNCER | 57 | UNCER | 77 | UNCER | 97 | UNCER | B7 | UNCER | D7 | UNCER | F7 | UNCER |
| 18 | UNCER | 38 | DB23 | 58 | DB19 | 78 | UNCER | 98 | DB11 | B8 | UNCER | D8 | UNCER | F8 | DB24 |
| 19 | DB40 | 39 | UNCER | 59 | UNCER | 79 | UNCER | 99 | UNCER | B9 | UNCER | D9 | UNCER | F9 | UNCER |
| 1A | DB36 | 3A | UNCER | 5A | UNCER | 7A | UNCER | 9A | UNCER | BA | UNCER | DA | UNCER | FA | UNCER |
| 1B | UNCER | 3B | UNCER | 5B | UNCER | 7B | UNCER | 9B | UNCER | BB | UNCER | DB | UNCER | FB | UNCER |
| 1C | DB32 | 3C | UNCER | 5C | UNCER | 7C | UNCER | 9C | UNCER | BC | UNCER | DC | UNCER | FC | UNCER |
| 1D | UNCER | 3D | UNCER | 5D | UNCER | 7D | UNCER | 9D | UNCER | BD | UNCER | DD | UNCER | FD | UNCER |
| 1E | UNCER | 3E | UNCER | 5E | UNCER | 7E | UNCER | 9E | UNCER | BE | UNCER | DE | UNCER | FE | UNCER |
| 1F | DB62 | 3F | UNCER | 5F | UNCER | 7F | UNCER | 9F | UNCER | BF | UNCER | DF | UNCER | FF | UNCER. |

17. The computer system of claim 16, wherein the memory sub-system includes 36 or less memory address bits.

18. The computer system of claim 8, wherein the error detection and correction device generates a syndrome table which includes a plurality of entries mapped to correctable or uncorrectable errors, and wherein a detected multiple-bit error in the memory data bits is mapped to an uncorrectable error entry and a detected error in the memory address bits is mapped to an uncorrectable error entry.

19. A method of detecting errors in a processor bus in a computer system, the processor bus having address bits, data bits, and check bits, the method comprising:

receiving the address bits, data bits, and check bits; and detecting an error in the address bits or data bits using the check bits, wherein the error detecting step is operable to detect either an even number of erroneous bits or an odd number of erroneous bits in the address bits.

20. A computer system, comprising:

a CPU;

a processor bus coupled to the CPU having data bits and check bits; and an error management device coupled to the processor bus to detect an error in the data bits using the check bits, wherein the error management device disables correction of the data bits using the check bits.

21. The computer system of claim 20, wherein the CPU includes a Pentium® Pro processor.

22. A method of detecting errors in data bits of a processor bus coupled to a CPU in a computer system, the method comprising:

receiving check bits and data bits of the processor bus;

detecting an error in the data bits using the check bits; and disabling correction of the data bits using the check bits.

23. The method of claim 22, wherein the CPU includes a Pentium® Pro processor.

* * * * *